United States Patent
Ellin et al.

(10) Patent No.: US 8,466,943 B2
(45) Date of Patent: Jun. 18, 2013

(54) LASER MARKING

(75) Inventors: Alexander David Scott Ellin, Gloucestershire (GB); James Reynolds Henshaw, Gloucestershire (GB)

(73) Assignee: Renishaw PLC, Wotton-Under-Edge (GB)

( * ) Notice: Subject to any disclaimer, the term of this patent is extended or adjusted under 35 U.S.C. 154(b) by 1688 days.

(21) Appl. No.: 10/500,716

(22) PCT Filed: Jan. 20, 2003

(86) PCT No.: PCT/GB03/00266
§ 371 (c)(1),
(2), (4) Date: Jul. 6, 2004

(87) PCT Pub. No.: WO03/061891
PCT Pub. Date: Jul. 31, 2003

(65) Prior Publication Data
US 2005/0045586 A1    Mar. 3, 2005

(30) Foreign Application Priority Data
Jan. 18, 2002    (GB) .................................. 0201101.3

(51) Int. Cl.
*B23K 26/00*    (2006.01)
*B23K 26/36*    (2006.01)
*G01B 15/00*    (2006.01)
*G01D 13/00*    (2006.01)

(52) U.S. Cl.
USPC .... 347/224; 216/65; 219/121.61; 219/121.68

(58) Field of Classification Search
USPC ............. 219/121.68, 121.69, 121.82; 216/65; 347/224, 264
See application file for complete search history.

(56) References Cited

U.S. PATENT DOCUMENTS

| | | | |
|---|---|---|---|
| 3,959,819 A | 5/1976 | Kubo | |
| 4,406,939 A | 9/1983 | Golker | |
| 4,486,794 A | 12/1984 | Itoh | |

(Continued)

FOREIGN PATENT DOCUMENTS

| | | |
|---|---|---|
| DE | 30 42 650 | 11/1980 |
| DE | 196 08 937 | 9/1996 |

(Continued)

OTHER PUBLICATIONS

Derwent-acc-No. 1981-F1801D; Title: Producing division markings for optical rules—using local evaporation of substrate coating by laser or electron beam; Inventor, fink, P. A.; Patent-Family, DE3042650A; 1 sheet.*

(Continued)

*Primary Examiner* — Samuel M Heinrich
(74) *Attorney, Agent, or Firm* — Oliff & Berridge, PLC

(57) ABSTRACT

A method and apparatus is disclosed for producing precision marks (28) for a metrological scale in the form of a stainless steel ribbon (10). A laser (21) is used to produce ultra-short pulses, which have a fluence at the ribbon such that ablation takes place. The laser light can be scanned via scanner (25) and the pitch of the marks (28) can be controlled. The ablative technique causes little thermal input and improves the accuracy of the scale.

38 Claims, 4 Drawing Sheets

U.S. PATENT DOCUMENTS

| | | | | |
|---|---|---|---|---|
| 4,932,131 A | * | 6/1990 | McMurtry et al. | 33/1 M |
| 5,463,200 A | * | 10/1995 | James et al. | 219/121.68 |
| 5,630,979 A | * | 5/1997 | Welz et al. | 264/400 |
| 5,736,709 A | * | 4/1998 | Neiheisel | 219/121.61 |
| 6,066,830 A | * | 5/2000 | Cline et al. | 219/121.69 |
| 6,156,030 A | * | 12/2000 | Neev | 606/10 |
| 6,159,832 A | * | 12/2000 | Mayer | 438/584 |
| 6,160,568 A | * | 12/2000 | Brodsky et al. | 347/247 |
| 6,423,935 B1 | * | 7/2002 | Hackel et al. | 219/121.85 |
| 6,433,303 B1 | | 8/2002 | Liu et al. | 219/121.7 |
| 6,451,421 B1 | | 9/2002 | Robertson et al. | 428/315.5 |
| 6,613,087 B1 | * | 9/2003 | Healy et al. | 623/2.14 |
| 6,621,040 B1 | * | 9/2003 | Perry et al. | 219/121.67 |
| 6,703,582 B2 | * | 3/2004 | Smart et al. | 219/121.62 |
| 6,776,340 B2 | * | 8/2004 | Murokh et al. | 235/454 |
| 6,930,842 B2 | | 8/2005 | Shibazaki | |
| 7,088,650 B1 | * | 8/2006 | Worthington et al. | 369/47.15 |
| 2001/0028385 A1 | | 10/2001 | Hayashi | |
| 2003/0015672 A1 | * | 1/2003 | Gallagher | 250/548 |
| 2004/0094728 A1 | * | 5/2004 | Herzog et al. | 250/559.06 |
| 2005/0079499 A1 | | 4/2005 | Ellin et al. | |

FOREIGN PATENT DOCUMENTS

| | | | |
|---|---|---|---|
| EP | 0 048 487 A2 | | 3/1982 |
| EP | 0 380 810 A2 | | 8/1990 |
| EP | 0 420 667 A2 | | 4/1991 |
| EP | 1145797 A2 | * | 10/2001 |
| EP | 1145797 A3 | * | 10/2002 |
| EP | 1 469 969 B1 | | 8/2011 |
| JP | A-53-128355 | | 11/1978 |
| JP | A-60-31369 | | 2/1985 |
| JP | 01-109319 | | 4/1989 |
| JP | A 04-033784 | | 2/1992 |
| JP | A-5-99694 | | 4/1993 |
| JP | 405169286 A | * | 7/1993 |
| JP | A-06-328276 | | 11/1994 |
| JP | U 3009367 | | 4/1995 |
| JP | U-3033499 | | 11/1996 |
| JP | A 09-085475 | | 3/1997 |
| JP | A-11-033763 | | 2/1999 |
| WO | WO 99/20427 | | 4/1999 |

OTHER PUBLICATIONS

Translation of DE019608937A1.*
Dec. 26, 2008 Office Action issued in Japanese Patent Application No. 2003-561816 (with English Translation).
May 26, 2010 Office Action issued in European Patent Application No. 03 701 588.0.
Dec. 6, 2010 Third Party Communication issued in European Patent Application No. 03 701 588.0 (with English Translation).
X. Liu, et al.; Laser Ablation and Micromachining with Ultrashort Laser Pulses; IEEE Journal of Quantum Electronics, vol. 33, No. 10; Oct. 1997; pp. 1706-1716.
May 9, 2012 Opposition issued in European Patent Application No. 03 701 588.0.
Dec. 18, 2012 Response to Opposition filed in European Patent Application No. 03 701 588.0.
May 14, 2012 Communication of Opposition and Opposition Form issued in European Patent Application No. 03 701 588.0 (with English Translation).
Dec. 8, 2005 Third Party Observations in European Patent Application No. 03 701 588.0 (with English Translation).
Nov. 22, 2006 Office Action issued in Chinese Patent Application No. 03802439X (with English Translation).
Aug. 21, 2012 Response filed in European Patent Application No. 11006696.6.
Apr. 20, 2012 Notice of Allowance issued in Japanese Patent Application No. 2008-215853 (with English Translation).
Aug. 12, 2011 Office Action issued in Japanese Patent Application No. 2008-215853 (with English Translation).
Jan. 26, 2012 Extended Search Report issued in European Patent Application No. 11 00 6696.6.
Jun. 19, 2009 Office Action issued in Japanese Patent Application No. 2003-561816 (with English Translation).
Different Translation of DE 196 08 937 A1 published Sep. 12, 1996 in Germany.
Sep. 17, 2003 International Search Report issued in Application No. PCT/GB2003/00266.
Apr. 25, 2008 Office Action issued in Japanese Patent Application No. 2003-561816 (English Translation only).

* cited by examiner

LASER MARKING

BACKGROUND

This invention relates to the forming of readable (not necessarily optically) precision marks, a pattern or other indicia on metrological and like equipment by means of irradiation of laser light. In particular but not exclusively it relates to the formation of a pattern of marks on an object e.g. graduation marks on a scale to be used for metrological purposes.

Some major problems encountered when using a beam of laser light for marking a surface or subsurface of a material are: the dimensional control of the laser light with respect to that surface/subsurface e.g. to maintain accurate spacing of the marks; the correct selection of parameters of the light e.g. beam fluence (energy per unit area) duration of exposure of the surface/subsurface and; the adaptation of the marking process to suit different applications such as the ability to mark flat surfaces as well as curved surfaces; and the ability to produce patterns of marking having different pitch lengths. As well as these problems heat build-up at the laser exposed area is problematic because this changes the dimensions of the resultant scale and leads to inaccuracy. Particularly problematic is the heat build-up in thin metallic metrological scales, like stainless steel which can buckle and become brittle as a result of excessive heat.

The production of measurement scale using a laser light to mark its surface has been considered previously. In U.S. Pat. No. 4,932,131 an in-situ scale writing or calibration technique is used. A reference is used to lay-down marks or correct any deficiencies in the scale. A laser is used to read and write a scale but there is no disclosure of the method for doing this, and no mention of overcoming thermal problems.

JP 5169286 shows a method of obtaining a marking perpendicular to the direction of travel of a measurement scale which is being marked using a laser. In JP 5169286 there is no discussion of thermal problems and no mention of the apparatus which controls the firing of the laser or the beam's position relative to the scale.

It is known that there are effectively two different mechanisms for pulsed laser ablation of materials and that the key factor for determining which mechanism is employed is the pulse length. Essentially, for pulse lengths above approximately 4 picoseconds, the material is melted and then boiled off from the surface with considerable transfer of thermal energy into the remaining material. For pulse lengths below approximately 4 picoseconds (i.e. ultrashort pulses), the molten stage is omitted with the material either (depending on correct understanding of the mechanism) being sublimated straight from the solid to the gaseous or ejected from the substrate as minute solid particles. When ultrashort pulses are used, the amount of thermal energy transferred to the material is significantly reduced.

SUMMARY

The inventors of the present application have now found that the use of an ultrashort pulse laser for producing the graduations on a precision metrological scale (i.e. having tolerance of a few µm per m) is advantageous as it reduces any allowance that has to be made for thermal effects when positioning one graduation relative to others during the graduation marking process, thus scale accuracy is improved.

The invention according to a first aspect provides a method of producing precision marks for a metrological scale, employing apparatus including: a scale substrate to be marked at repeated instants by a laser and thereby forming a metrological scale; a laser operable so as to provide light pulses for forming scale markings at the substrate; a displacement device for causing relative displacement between the substrate and the location at which the light is incident on the substrate; and a controller for controlling the relative displacement and the laser, the method comprising the steps, in any suitable order, of:
operating the displacement mechanism so as to cause relative displacement between the substrate and the light;
using the controller to control the relative displacement and to operate the laser so as to produce light pulses at the substrate;
characterised in that:
the laser produces a plurality of ultra-short output pulses of a fluence at the substrate such that the metrological scale marks are formed by laser ablation.

The invention according to a further aspect provides apparatus for producing precision marks for a metrological scale comprising: a scale substrate to be marked at repeated instants by a laser and thereby forming a metrological scale; a laser operable so as to provide light pulses for forming scale markings at the substrate; a displacement device for causing relative displacement between the substrate and the location at which the light is incident on the substrate; and a controller for controlling the relative displacement and for operating the laser so as to produce light at the substrate, characterised in that the pulses of light produced by the laser are ultra-short pulses of a fluence at the substrate such that the metrological scale marks are formed by laser ablation.

The present invention according to a further aspect provides a metrological scale comprising a substrate having scale marks thereat formed by pulses of light from a laser characterised in that the pulses are ultra short ablative pulses.

The invention is further refined by the selection of the correct fluence to ensure the most efficient removal of material and optimum surface finish of the ablated area. As the fluence is increased above the threshold value (Fth) for the material, ablation takes place leaving, at low fluence levels, a relatively smooth surface and, as the fluence is increased, so does the roughness of the surface finish.

It has now been determined that, for ultrashort pulsed laser beam the fluence for optimum rate of material removal is approximately $e^2$ times the threshold fluence Fth for that material (e being the mathematical constant for the base of natural logarithms and being equal to about 2.72). This fluence level also gives a surface finish which presents a good optical contrast to an otherwise polished substrate.

So in a preferred feature of the invention the pulse energy is approximately $e^2$Fth.

Further aspects of the invention provide marking apparatus for repeatedly marking a object comprising: a controller; a laser for providing an output beam of laser light at repeated instants; optical elements for irradiating the object for causing the markings; a displacement device for causing relative displacement between the object and the beam; a displacement sensor for sensing the relative displacement and for issuing a displacement signal to the controller, and; a reader for determining the distance between two or more markings produced when the object is subjected to the beam and for issuing a pitch signal to the controller; the controller in use controlling, in response to displacement and pitch signals, the repeated instants at which the laser emits its beam.

Thus, in an embodiment of the invention apparatus is provided which moves a blank scale past a laser light source which may have beam manipulation (e.g. beam shaping lens and/or a scanner). The movement of the scale is monitored by a controller and the appropriate laser firing signals are given by the controller. The controller monitors the pitch of graduation marks produced by the laser by using scale readers disposed downstream of the point at which the marking takes place and any pitch correction required is made by the controller.

Preferably the invention provides for the repeated instants at which the laser emits its beam to be advanced or retarded, or the manipulation to be changed, all in response to known apparatus error information accessible by the controller.

Thus, in the said embodiment the controller has access to a map of known repeatable errors which occur during use of the apparatus and those known errors are compensated by advancing or retarding the time at which the laser is fired and/or changing the manipulation (e.g. the scanner path).

Other aspects of the invention provide a number of techniques described herein for irradiating an object so as to form a marking of a desired configuration. Preferably such markings form graduation marks on a measurement scale e.g. an elongate linear scale, a rotary encoder scale or having two dimensionals.

BRIEF DESCRIPTION OF THE DRAWINGS

Various features of the invention will now be described with reference to the drawings, wherein.

DETAILED DESCRIPTION OF PREFERRED EMBODIMENTS

Figure 1:
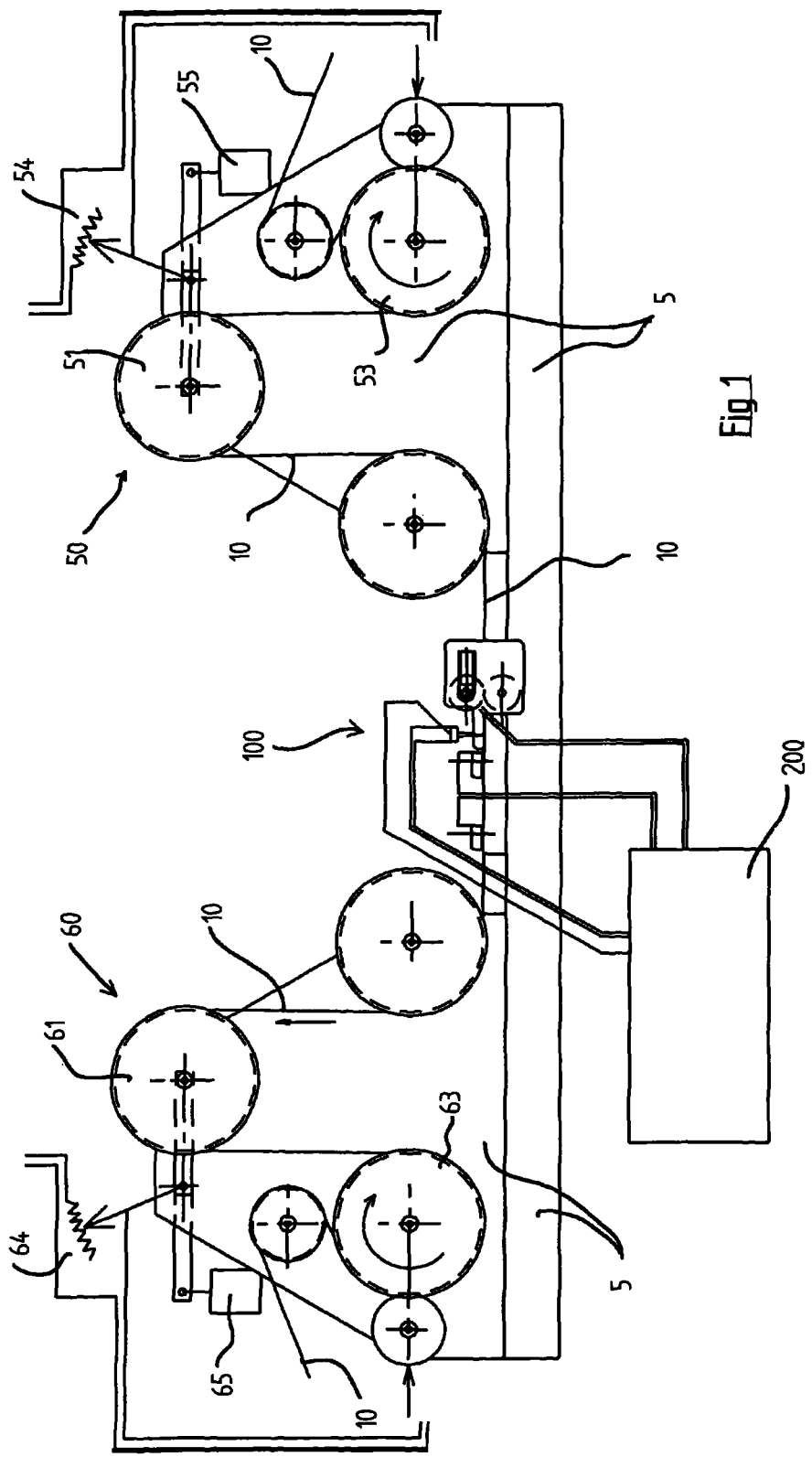
FIG. 1 shows manufacturing apparatus according to the invention for producing measurement scale.

FIG. 1 shows a manufacturing apparatus for making markings on a continuous flexible ribbon of material approximately 10 mm wide and 0.3 mm thick (e.g. from a reel of the material) fed to the apparatus. In this example the material is polished stainless steel. The apparatus has a frame 5 to which various elements of the apparatus are attached. The ribbon 10 traverses firstly a tensioning system 50, then it is fed to a marking station 100, and then onto another tensioning system 60 which opposes the first tensioning system 50. Both tensioning systems impart constant tension in the ribbon as it moves through the marking station irrespective of the speed of the ribbon.

In each tensioning system a counterweight 55,65 provides an upward force to a moveable roller 51,61 via a pivot 52,62.

A feed motor for driving feed wheel 53,63 increases or decreases in rotational speed in response to the lowering or raising of the weight 55,65. A potentiometer 54,64 controls the speed of the motor and is connected to the pivot 52,62 also, such that the lowering and raising of the wheel changes the resistance of the potentiometer. If the speed of the feed roller is too slow the roller 51, 61 will fall and the potentiometer resistance will decrease. In so doing the lowering of the resistance will cause the feed motor to increase the speed of the feed wheel 53, 63 and vice versa.

Figure 2:
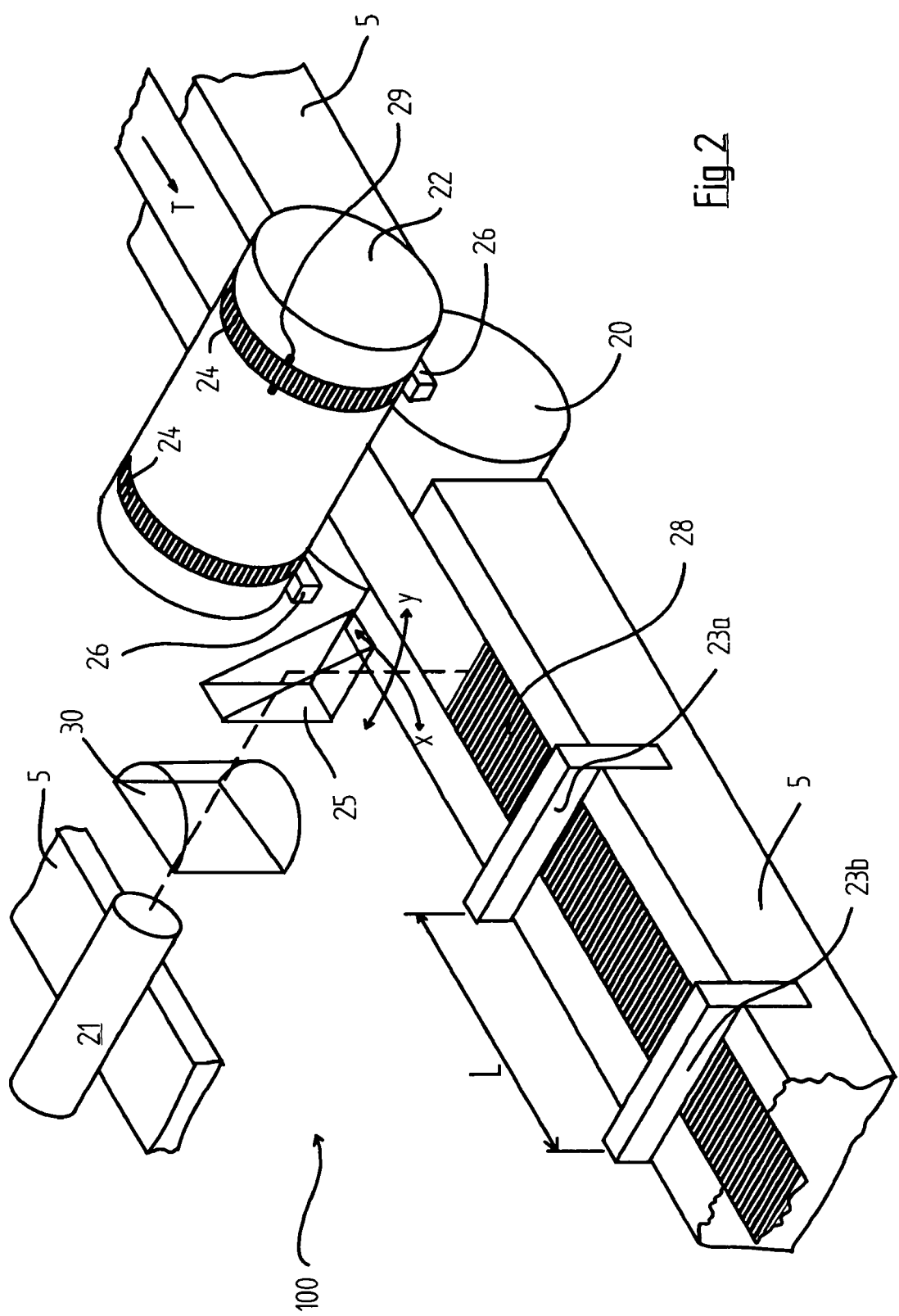
FIG. 2 shows part of the apparatus shown in FIG. 1 in more detail.

The ribbon's displacement is governed by the marking station 100 which is illustrated in more detail in FIG. 2.

In FIG. 2 two pinch rollers 20 and 22 are used to feed the ribbon (which has constant tension through the station 100. Pinch roller 20 is driven at an approximately constant rate but no speed governing need be used other than a controllable voltage supply. Pinch roller 22 has two rotary encoder rings 24 affixed thereto or marked thereon. Two readers 26 read the encoder markings to provide a machine controller (200 FIG. 1) with two signals so an average of the two can be used to provide a ribbon displacement value to the controller. This averaged ribbon displacement signal at the machine controller 200 is used, via software, to govern the firing of ribbon marking laser 21.

Additionally a system of two or more scale readers, in this instance two readers 23a and 23b, are used to read the scale that is being produced by the laser 21. The readers 23 are set at a pre-determined distance L apart and so any errors in the pitch of the markings can be determined and adjustment via software of the laser firing rate can be made if appropriate. So even if the temperature at the laser irradiated area increases slightly, the temperature at the readers will remain constant and then any slight heating by the laser light can be compensated for by increasing the scale pitch at the laser irradiated area.

So, the laser can produce markings when desired and to a corrected pitch.

The scale produced by the apparatus described above will be very accurate. However, its accuracy may be further improved by removing repeated errors which arise through machine imperfections like: slightly inaccurate markings on the rotary encoder rings 24; run-out of these rings; eccentricity of either pinch roller 22 or 20; or persistent inaccuracies in the movements of the scanner 25 used to control the position of the laser on the scale 10.

If several samples of scale are produced each having several cycles of the pinch roller rotation, and the patterns of the scale on the samples are measured using a highly accurate linear measurement device (eg an interferometric measurement device) then, using mathematical analysis, the repeated deviations in the scale can be found. It is possible then to provide an error map for the scale producing apparatus which can be stored for use by the machine controller 200 to correct the laser firing and/or scanner movements so as to eliminate those repeated errors.

During such an error mapping procedure it is important to ascertain the position of the pinch rollers in relation to the sample scale so that the error correction (advancement or retardation of the fire signal) can occur at the correct moment in time. To this end an index mark 29 is placed on each roller 20/22 and the positions of the rollers at the start of production are recorded, eg by producing a corresponding mark on the scale.

The error map stored in the machine controller 200 can be accessed during scale production thereafter and could be updated at intervals by repeating the procedure outlined above so as to maintain the enhanced accuracy of the apparatus.

The above method describes exemplary techniques and apparatus for positioning measurement scale relative to a laser. The following description details examples the laser parameters used and techniques for marking a scale but these concepts have application to other products.

The laser used for marking is a titanium-sapphire laser which is ideal for firing ultrashort high energy pulses of light. For pulse lengths below approximately 4 picoseconds (i.e. ultrashort pulses), ablation of material subjected to a pulse takes place provided that the beam energy (F) referred to as "fluence" is above a threshold (Fth). The amount of thermal energy transferred to the material is significantly less than that transferred when using longer pulses.

It has been found when the fluence is increased above the threshold value (Fth) for the material, ablation takes place leaving, at low fluence levels, a relatively smooth surface and, as the fluence is increased, so does the roughness of the surface finish. Also it has been found that the most efficient removal of material and optimum surface finish of the ablated area is obtained when the fluence is approximately $e^2$ times the threshold fluence Fth for that material. Further, reasonably good results are obtained when the range 4 to 12 times the threshold fluence is used. This fluence range also gives a surface finish which presents a good optical contrast to an otherwise polished substrate.

Thus, in the production of the stainless steel scale illustrated in FIGS. 1&2, a titanium sapphire laser is used to fire ultra-short laser pulses of about 100 femtoseconds at a repetition rate of about 5 kHz. An output beam from the laser is focused to a fluence in the region of 12-16 kJ/m². The exact parameters depend on the material to be marked. The depth of ablation on the scale surface will dependent also on the characteristics of the material and the fluence of the beam, but typically will be in the order of a few hundred nanometres (nm=m×$10^{-9}$). If a continuous substrate like stainless-steel is used as a scale then a few pulses of laser light will be required in order to generate the depth of marking required to enable a scale reader to differentiate between a marked and an unmarked surface. It is possible also that the surface of the scale may be a film, eg a chromium layer on, say, a glass substrate, and the depth of ablation may be that which is sufficient to substantially remove the film. If a phased light interference pattern is required then the depth of pattern required will depend on the wavelength of light used during use of the grating.

Where short pulse ablation is used the technique imparts little thermal energy to the scale. This means that no major compensation has to be made to the dimensions of the markings because there is very little thermal expansion. Also heat distortion of the scale does not take place.

Depending on the power of the laser used and (if required) the movement of the laser beam relative to the scale, various marking techniques can be used. For a given pulse energy, the desired fluence is selected by varying the area over which the laser beam is focused. The relationship between that area and the desired line width dictates which of these techniques is applicable. The following paragraphs use scale of 40 µm pitch P (i.e. 20 µm line width and a 20 µm space) and 6 mm wide as an example in FIG. 3.

The output of the beam will require some manipulation. If the laser had sufficient pulse energy to give the correct fluence over the entire 20 µm by 6 mm line, the simplest way to mark the scale would be to move the scale to a position where it is to be marked, stop movement, fire the laser then move the scale to the next position to be marked. The laser beam output 27 might be flattened and elongated (see below) to produce a thin line (usually an ellipse) and therefore would produce a corresponding line pattern without the need to move the beam across the width of the scale (in the y direction in FIG. 3).

If the pulse energy was insufficient to give the correct fluence over the entire 6 mm line length, Beam 27 might be shaped e.g. to form a round spot or ellipse which is shorter than the width of the scale markings required. In which case the beam can be moved (scanned) across the scale (in the y direction) whilst the scale is stationary.

Whilst the above techniques give adequate results it is preferred to scan the beam in the directions of x and y (in any combination) using an optical scanner 25 and to keep the scale moving constantly. If the scale is kept moving constantly then the scale can be advanced more quickly and faster production of the patterns produced by the laser can be made.

Figure 3A:
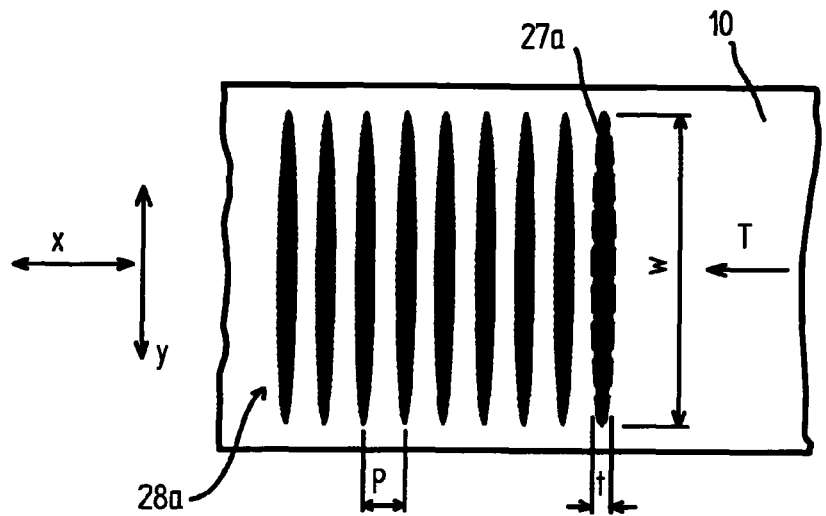
FIGS. 3a to 3e show various techniques for marking the measurement scale shown in the previous figures.

A number of marking techniques are illustrated in FIGS. 3*a,b,c,d* and *e*.

FIG. 3*a* shows an elliptical irradiated area (called a spot in this application). In practice the spot has dimensions approximately 20 µm in width t and 6 mm long w. The ratio of t:w is not shown to scale in any of the FIG. 3. The spot is not moved in the y direction but is fired many times at the scale 10 as it is advanced with the scale 10 so as to keep pace with it as it moves continuously in the direction of arrow T. The spot is caused to fly back to its start position once it has treated the surface of the scale sufficiently. In this example a 1 Watt laser is used which will need to be fired approximately 30-60 times at the surface of the scale. Thus scale markings 28*a* of a 40 µm pitch can be produced at a rate of about 50-80 per second, i.e. 30-60 firings at repetitions of 5 kHz and then fly back to the next start position.

Figure 3B:
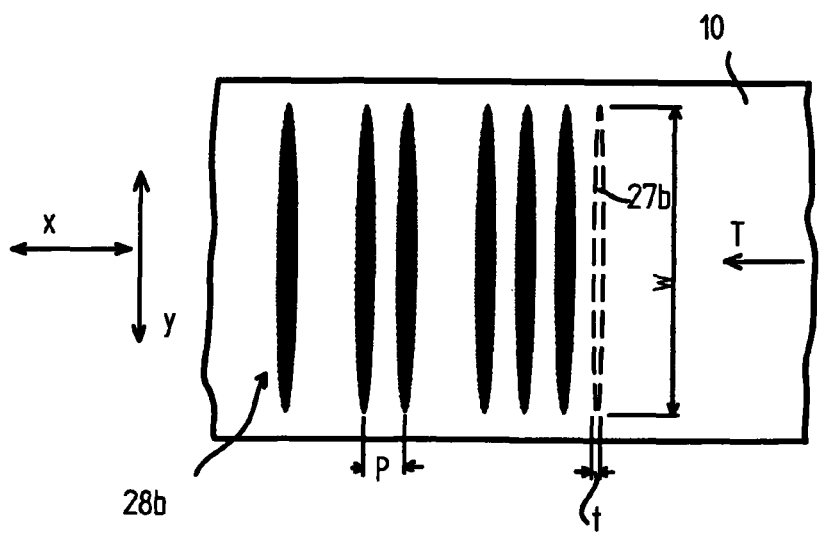

Alternatively, a lower pulse energy could be focused into a spot 6 mm long but less than 20 µm wide. FIG. 3*b* shows an elliptical spot 27*b* of such a configuration having a length w of 6 mm and a width t of µ5 m. In this arrangement the spot is not scanned in the y direction because it has sufficient width w to cover the width of the scale required. The scale 10 is moved and the spot 27*b* is again scanned in the X direction so as to keep pace with the movement of the scale. When the requisite treatment has been performed on the area of the surface of the scale irradiated by the spot (the first position) then the spot is moved.

The spot can be moved on to various positions. It can be moved to a position one 40 µm pitch on from the first position, so that scale markings having non-unity mark/space ratio are created (see below). Alternatively the spot can be moved to a position 5 µm from the first position (the second position, directly adjacent the first position) and then scanned again to keep pace with the scale movement. When the requisite amount of treatment has been given at the second position a band of treatment twice the width of the spot (i.e. 10 µm wide will be produced. Repeating the treatment at further adjacent positions can produce a scale having markings which are further multiples of the spot width.

Yet another alternative is moving the spot a fraction of the spot width, or allowing the spot to fall behind the movement of the scale whilst it is treating the scale, giving give markings which can be non integer multiples of the spot width.

The spot can be caused to move in any x and/or y direction and be fired at any time. An advantage of this is that parts of the scale produced can be missed out (as shown) and altered in some way (e.g. markings which are less deep than other markings). Such markings can be used as reference marks or absolute dimensions on a scale.

Figure 3C:
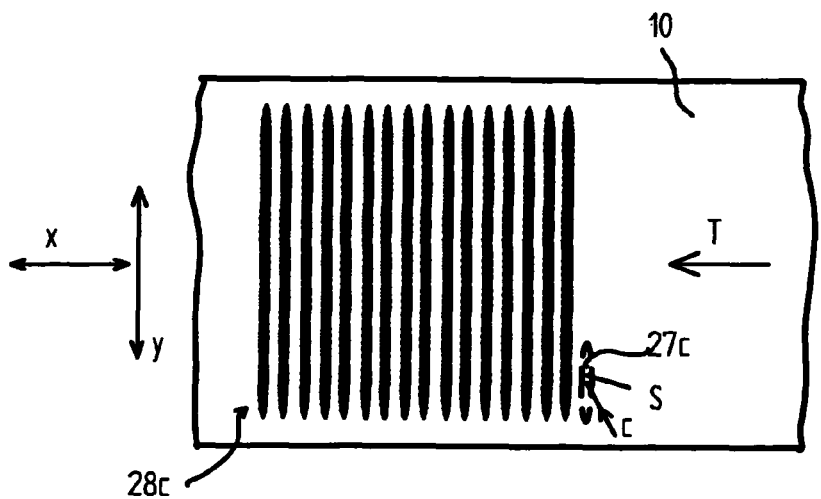

FIG. 3*c* shows another method of marking with the same lower pulse energy. Spot 27*c* is again focussed at a start position and is scanned in the direction c as scale moves in the direction T. The spot in this instance is elliptical and is approximately 20 µm wide and 1.5 mm long. Whilst being scanned the spot performs the desired treatment at the surface of the scale. In this instance the treatment is a series of overlapping ablations which form a line pattern. The spot is caused to fly back to position S once it has finished its treatment.

Figure 3D:
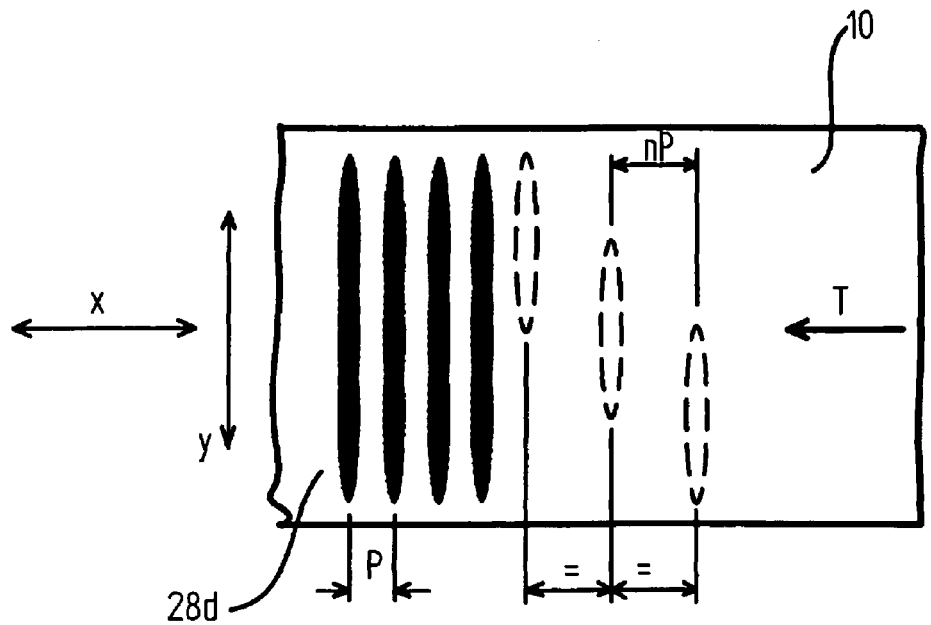

The correct fluence can be achieved by splitting the beam into a number of smaller spots instead of one larger one. Another method of marking is shown in FIG. 3*d* this alternative method utilises a row of spots 27*d* which are fixed in relation to the x and y directions. The scale is moved in the direction of arrow T and the positions at which the spots are aimed are not moved. The firing of the laser occurs once the scale has been stopped when the distance travelled by the scale in direction T is equal to nP where P is the pitch of the desired pattern and n is an integer value used to space the spots 27d apart. The firing at each successive interval when the scale has been displaced by distance nP comprises a number of ablations in order to obtain the correct depth of treatment.

Figure 3E:
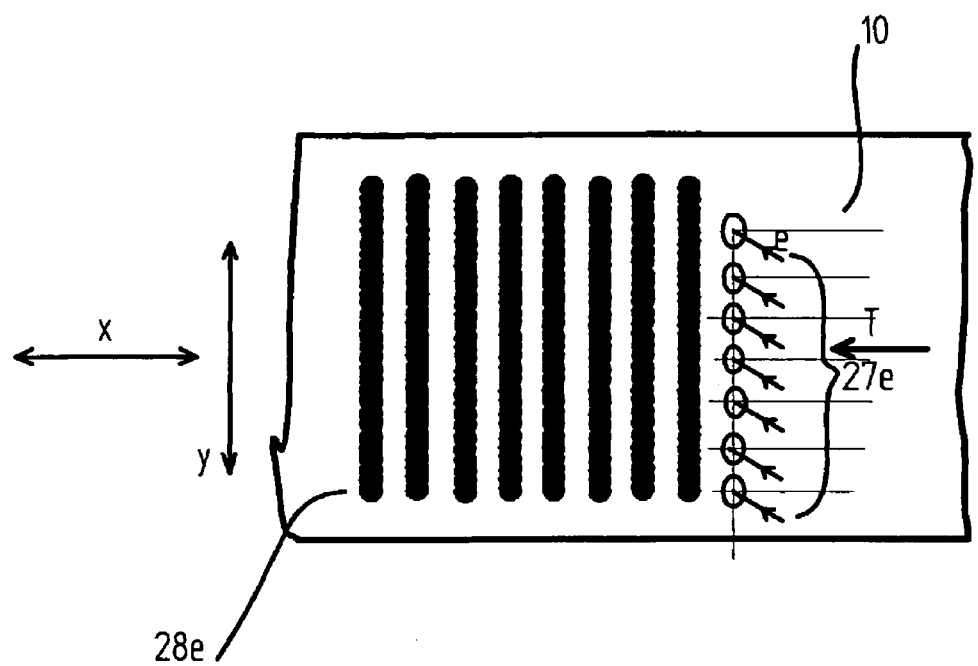

In the method illustrated in FIG. 3e a number of slightly elliptical spots (they may circular) are scanned in the directions e (which has just y or x&y components depending on spot configuration) as the scale advances in the direction of arrow T. A series of laser firings will be required and an overlapping pattern of spots will result in a straight line pattern 28e being produced. The multiple spots used in the methods illustrated in FIGS. 3d and 3c are produced by optically splitting the output beam of the laser.

In each of the methods illustrated in FIG. 3 selective advance of retardation of the firing of the laser can be used, controlled by controller 200, to correct any detected errors in the pitch of the patterns 28 and/or to correct any known machine errors resulting from the error mapping described above. The elliptical spots shown are formed by passing the output beam of the laser either a cylindrical lens or a system of spherical and/or cylindrical lenses.

The methods illustrated in FIG. 3 and the laser parameters described may be applied to the production of other flat ribbon measurement scale. Also any component may be treated in the manner described and illustrated above eg short lengths of round or flat bar, the actual components of the machines that require relative displacement to be measurement, like linear motor shafts, ball screw shafts and other forms of leadscrew, beds of machine tools, relatively rotatable parts like rotary encoders and other devices that have relatively moveable parts.

In such instances the part to be marked could be moved relative to the laser or vice versa, and that relative movement will be monitored by a reference measurement device eg the rotating pinch rollers 20, 22, an accurate linear encoder, or an interferometric measurement device.

Where non-planar surfaces of parts require marking then it is possible for that part to be rotated whilst it is being marked. However, only relatively small diameter parts (less than 25 mm in diameter) would need to be rotated. Larger diameter parts will have sufficient flatness and the focal depth of the laser beam will be sufficient so that such parts could be treated like the flat ribbon mentioned above.

The invention is particularly suited to the production of thin ribbon e.g. 6 mm or less in thickness and of coilable nature, but is not limited to such material.

It has been found that conventional laser treatment of such ribbon is unsatisfactory when attempting to produce accurate metrological scale of such a thickness. Such known techniques are extremely difficult when using metallic ribbon of a thickness less than 6 mm because unacceptable thermal expansion occurs, and are almost impossible when using ribbon of 1 mm or less in thickness because thermal distortion occurs. Thus the invention is advantageous when producing metallic metrological scale having a thickness of less than 6 mm e.g. ribbon, sheet 2D grid encoders or rotary encoders, and is particularly advantageous when producing metallic scales of 6 mm or less.

This invention is most advantageous when producing metallic metrological scale having a thickness of less than 1 mm. By experimentation it has been found that exceeding a bulk temperature rise in the material of the scale of 6° C. has a significant adverse effect on accuracy of the scale. So the parameters of pulse duration, speed of relative travel between the laser ablation area and the scale, and the scale cross sectional area of the scale are all chosen to keep the temporary bulk temperature rise at the ablation area to less than about 6° C.

This low rise in temperature and ablative technique result in thermal expansion uncertainties typically below 3 parts per million and usually below 1 part per million. Thus accuracy of the scale has an uncertainty of better than 3 parts per million.

Ablation according to the invention, also provides excellent optical contrast with a reflectivity reduction at the ablated area. A 3 times reduction or greater is possible.

The invention claimed is:

1. A method of producing precision marks for a metrological scale, employing apparatus including: a scale substrate to be marked at repeated instants by a laser and thereby forming a metrological scale; a laser operable so as to provide light pulses for forming scale markings at the substrate; a displacement device for causing relative displacement between the substrate and the location at which the light is incident on the substrate; and a controller for controlling the relative displacement and the laser, the method comprising the steps, in any suitable order, of:
operating the displacement mechanism so as to cause relative displacement between the substrate and the light;
using the controller to control the relative displacement and to operate the laser so as to produce light pulses at the substrate;
characterised in that:
the laser produces a plurality of ultra-short output pulses of a fluence at the substrate such that the metrological scale marks are formed by laser ablation, wherein the plurality of ultra-short output pulses have a duration such that the scale markings are formed on the scale substrate by a laser ablation mechanism in which the molten stage is omitted.

2. A method of producing precision marks, for a metrological scale as claimed in claim 1 wherein the substrate is subjected to a bulk temperature rise not exceeding about 6 degrees Celsius at the ablation area as a result of the ablation.

3. A method of producing precision marks for a metrological scale as claimed in claim 1 wherein the marks produced contrast optically with unablated substrate.

4. A method of producing precision marks for a metrological scale as claimed in claim 1 wherein the substrate is subjected to a bulk temperature rise causing thermal expansion uncertainties at the substrate ablation area below 3 parts per million.

5. A method of producing precision marks for a metrological scale as claimed in claim 3 wherein the optically contrasting marks have an altered reflectivity.

6. A method of producing precision marks for a metrological scale as claimed in claim 5 wherein the reflectivity of the marks is 3 or more times less than the reflectivity of the substrate.

7. A method of producing precision marks for a metrological scale as claimed in claim 1 wherein the substrate is flexible.

8. A method of producing precision marks for a metrological scale as claimed in claim 1 wherein the substrate is elongate.

9. A method of producing precision marks for a metrological scale as claimed in claim 8 wherein the substrate is a continuous metallic ribbon.

10. A method of producing precision marks for a metrological scale as claimed in claim 1 wherein the substrate is of a thickness of less than about 6 mm.

11. A method of producing precision marks for a metrological scale as claimed in claim 10 wherein the substrate is of a thickness of less than about 1 mm.

12. A method of producing precision marks for a metrological scale as claimed in claim 1 wherein the said displacement is continuous.

13. A method of producing precision marks for a metrological scale as claimed in claim 1 wherein the fluence at the centre center of the incidence is above the threshold for causing ablation by a factor of about 4 to about 12.

14. A method of producing precision marks for a metrological scale as claimed in claim 13 wherein the fluence at the centre of the incidence is above the threshold for causing ablation by a factor of about $e^2$, wherein e is a mathematical constant for a base of natural logarithms.

15. A method of producing precision marks for a metrological scale as claimed in claim 1 wherein the laser light is formed as at least one ellipse where the light is incident the substrate.

16. A method of producing precision marks for a metrological scale as claimed in claim 1 wherein the ultra-short pulses have a duration of less than 4 picoseconds.

17. A method of producing precision marks for a metrological scale as claimed in claim 1 further employing a laser light manipulation device, a displacement sensor for sensing the displacement between the substrate and the location at which the light is incident and a reader for determining the distance between two or more markings at the scale wherein the method further comprises:
    issuing a signal from the displacement sensor to the controller;
    issuing a signal from the reader to controller;
    in response to the signals from the sensor and the reader using the controller to control the manipulation device, the displacement, and the repeated instants at which the laser ablates the substrate.

18. A method of producing precision marks for a metrological scale as claimed in claim 17 wherein the displacement is linear movement in one direction and the light manipulation device is operable to cause the location at which laser light is incident at the substrate to move transversely to the said direction.

19. A method of producing precision marks for a metrological scale as claimed in claim 17 wherein the controller is used to further control the manipulation and/or displacement according to known apparatus error information.

20. Apparatus for producing precision marks for a metrological scale comprising: a scale substrate to be marked at repeated instants by a laser and thereby forming a metrological scale; a laser operable so as to provide light pulses for forming scale markings at the substrate; a displacement device for causing relative displacement between the substrate and the location at which the light is incident on the substrate; and a controller for controlling the relative displacement and for operating the laser so as to produce light at the substrate, characterised in that the pulses of light produced by the laser are ultra-short pulses of a fluence at the substrate such that the metrological scale marks are formed by laser ablation, wherein the plurality of ultra-short output pulses have a duration such that the scale markings are formed on the scale substrate by a laser ablation mechanism in which the molten stage is omitted.

21. Apparatus for producing precision marks for a metrological scale as claimed in 20 wherein the substrate is subjected to a bulk temperature rise not exceeding about 6 degrees Celsius at the ablation area as a result of the ablation.

22. Apparatus for producing precision marks for a metrological scale as claimed in claim 20 wherein the marks produced contrast optically with unablated substrate.

23. Apparatus for producing precision marks for a metrological scale as claimed in claim 20 wherein the substrate is subjected to a bulk temperature rise causing thermal expansion uncertainties at the substrate ablation area below 3 parts per million.

24. Apparatus for producing precision marks for a metrological scale as claimed in claim 22 wherein the optically contrasting marks have an altered reflectivity.

25. Apparatus for producing precision marks for a metrological scale as claimed in claim 24 wherein the reflectivity of the marks is 3 or more times less than the reflectivity of the substrate.

26. Apparatus for producing precision marks for a metrological scale as claimed in claim 20 wherein the substrate is flexible.

27. Apparatus for producing precision marks for a metrological scale as claimed in claim 20 wherein the substrate is elongate.

28. Apparatus for producing precision marks for a metrological scale as claimed in claim 27 wherein the substrate is a continuous metallic ribbon.

29. Apparatus for producing precision marks for a metrological scale as claimed in claim 20 wherein the substrate is of a thickness of less than about 6 mm.

30. Apparatus for producing precision marks for a metrological scale as claimed in claim 29 wherein the substrate is of a thickness of less than about 1 mm.

31. Apparatus for producing precision marks for a metrological scale as claimed in claim 20 wherein the said displacement is continuous.

32. Apparatus for producing precision marks for a metrological scale as claimed in claim 20 wherein the fluence at the centre center of ablation is above the threshold for causing ablation by a factor of 4 to 12.

33. Apparatus for producing precision marks for a metrological scale as claimed in claim 32 wherein the fluence at the centre of ablation is above the threshold for causing ablation by a factor of $e^2$, wherein e is a mathematical constant for a base of natural logarithms.

34. Apparatus for producing precision marks for a metrological scale as claimed in claim 20 further comprising a laser light manipulation device, a displacement sensor for sensing the displacement between the substrate and the location at which the light is incident and for issuing a signal from the displacement sensor to the controller and a reader for determining the distance between two or more markings at the scale and for issuing a signal from the reader to controller, the controller being further operable in response to the signals from the sensor and the reader so as to control the manipulation device, the displacement, and the repeated instants at which the laser ablates the substrate.

35. Apparatus for producing precision marks for a metrological scale as claimed in claim 34 wherein the displacement is linear movement in one direction and the light manipulation device is operable to cause the location at which laser light is incident at the substrate to move transversely to the said direction.

36. Apparatus for producing precision marks for a metrological scale as claimed in claim 34 wherein the controller is used to further control the manipulation and/or displacement according to known apparatus error information.

37. Apparatus for producing precision marks for a metrological scale as claimed in claim 20 wherein the laser light is formed as at least one ellipse at the area where the light is incident at the substrate.

38. Apparatus for producing precision marks for a metrological scale as claimed in 20 wherein the ultra-short pulses have a duration of less than 4 picoseconds.

* * * * *